(12) United States Patent
Lundin et al.

(10) Patent No.: US 12,481,479 B2
(45) Date of Patent: *Nov. 25, 2025

(54) IDENTIFYING CO-LOCATED DEVICES WITHIN A TELECONFERENCING SESSION

(71) Applicant: Google LLC, Mountain View, CA (US)

(72) Inventors: Henrik Fahlberg Lundin, Sollentuna (SE); Mans Gustaf Sebastian Ullberg, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,014

(22) Filed: Mar. 22, 2024

(65) Prior Publication Data

US 2024/0338169 A1 Oct. 10, 2024

Related U.S. Application Data

(63) Continuation of application No. 18/297,343, filed on Apr. 7, 2023, now Pat. No. 12,242,770.

(51) Int. Cl.
*G06F 3/16* (2006.01)
*H04L 65/403* (2022.01)

(52) U.S. Cl.
CPC .......... *G06F 3/165* (2013.01); *H04L 65/4046* (2013.01)

(58) Field of Classification Search
None
See application file for complete search history.

(56) References Cited

U.S. PATENT DOCUMENTS

| 11,418,655 | B2 | 8/2022 | Loiko et al. |
| 2008/0031468 | A1 | 2/2008 | Christoph et al. |
| 2011/0115876 | A1 | 5/2011 | Khot et al. |
| 2012/0069134 | A1 | 3/2012 | Garcia et al. |
| 2013/0169742 | A1 | 7/2013 | Wu et al. |
| 2015/0331938 | A1 | 11/2015 | Kalampoukas et al. |
| 2016/0019896 | A1 | 1/2016 | Guevara et al. |

(Continued)

FOREIGN PATENT DOCUMENTS

EP 3070876 9/2016

OTHER PUBLICATIONS

International Search Report and Written Opinion for Application No. PCT/US2023/078140, mailed Feb. 16, 2024, 12 pages.

*Primary Examiner* — Mandrita Brahmachari
(74) *Attorney, Agent, or Firm* — DORITY & MANNING P.A.

(57) ABSTRACT

A participant computing device connected to a teleconferencing session receives mixed audio data from a teleconference computing system orchestrating the session. The mixed audio data comprises a mix of audio captured by other devices connected to the session. The mixed audio and audio captured by the other devices prior to receipt of the mixed audio data are compared to determine that the participant computing device is co-located with at least one of the other devices. Information indicating that some of the other devices are featured devices that most actively contribute to the mixed audio is obtained. Co-location information for each of the featured devices is received. The co-location information is indicative of whether a featured device is co-located with the participant computing device. Based on the co-location information, a determination is made that one of the featured devices is co-located with the participant computing device.

20 Claims, 7 Drawing Sheets

(56) References Cited

U.S. PATENT DOCUMENTS

| | | |
|---|---|---|
| 2016/0029124 A1 | 1/2016 | Paranjpe |
| 2016/0050491 A1 | 2/2016 | Ahgren et al. |
| 2016/0142462 A1 | 5/2016 | Johnston et al. |
| 2018/0077205 A1 | 3/2018 | Fang et al. |
| 2021/0004201 A1 | 1/2021 | Munoz et al. |

IDENTIFYING CO-LOCATED DEVICES WITHIN A TELECONFERENCING SESSION

PRIORITY CLAIM

The present application is a continuation of U.S. application Ser. No. 18/297,343 having a filing date of Apr. 7, 2023. Applicant claims priority to and the benefit of each of such applications and incorporate all such applications herein by reference in its entirety.

FIELD

The present disclosure relates generally to device co-location in teleconferencing sessions. More specifically, the present disclosure relates to identifying specific co-located devices after detecting the occurrence of co-location.

BACKGROUND

Teleconferencing generally refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes receiving, by a participant computing device that is connected to a teleconferencing session and comprises one or more processors, mixed audio data from a teleconference computing system that orchestrates the teleconferencing session, wherein the mixed audio data includes mixed audio comprising audio captured by a plurality of second participant computing devices connected to the teleconferencing session. The method includes comparing, by the participant computing device, the mixed audio and audio captured by the participant computing device prior to receipt of the mixed audio data to determine that the participant computing device is co-located with at least one of the plurality of participant second computing devices. The method includes obtaining, by the participant computing device, information indicating that two or more of the plurality of second participant computing devices are featured devices that most actively contribute to the mixed audio. The method includes receiving, by the participant computing device, co-location information for each of the two or more featured devices, wherein the co-location information is indicative of whether a featured device is co-located with the participant computing device. The method includes, based on the co-location information for each of the two or more featured devices, making, by the participant computing device, a determination that at least one featured device of the two or more featured devices is co-located with the participant computing device.

Another aspect of the present disclosure is directed to a participant computing device. The participant computing device includes one or more processors. The participant computing device includes one or more non-transitory computer-readable media that store instructions that, when executed by the one or more processors, cause the participant computing device to perform operations. The operations include receiving mixed audio data from a teleconference computing system that orchestrates a teleconferencing session, wherein the participant computing device is connected to the teleconferencing session, wherein the mixed audio data includes mixed audio comprising audio captured by a plurality of second participant computing devices connected to the teleconferencing session. The operations include comparing the mixed audio and audio captured by the participant computing device prior to receipt of the mixed audio data to determine that the participant computing device is co-located with at least one of the plurality of second participant computing devices. The operations include obtaining information indicating that two or more of the plurality of second participant computing devices are featured devices that each contribute active audio to the mixed audio that is greater than a threshold degree of audio activity. The operations include receiving co-location information for each of the two or more featured devices, wherein the co-location information is indicative of whether a featured device is co-located with the participant computing device. The operations include, based on the co-location information for each of the two or more featured devices, making a determination that at least one featured device of the two or more featured devices is co-located with the participant computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
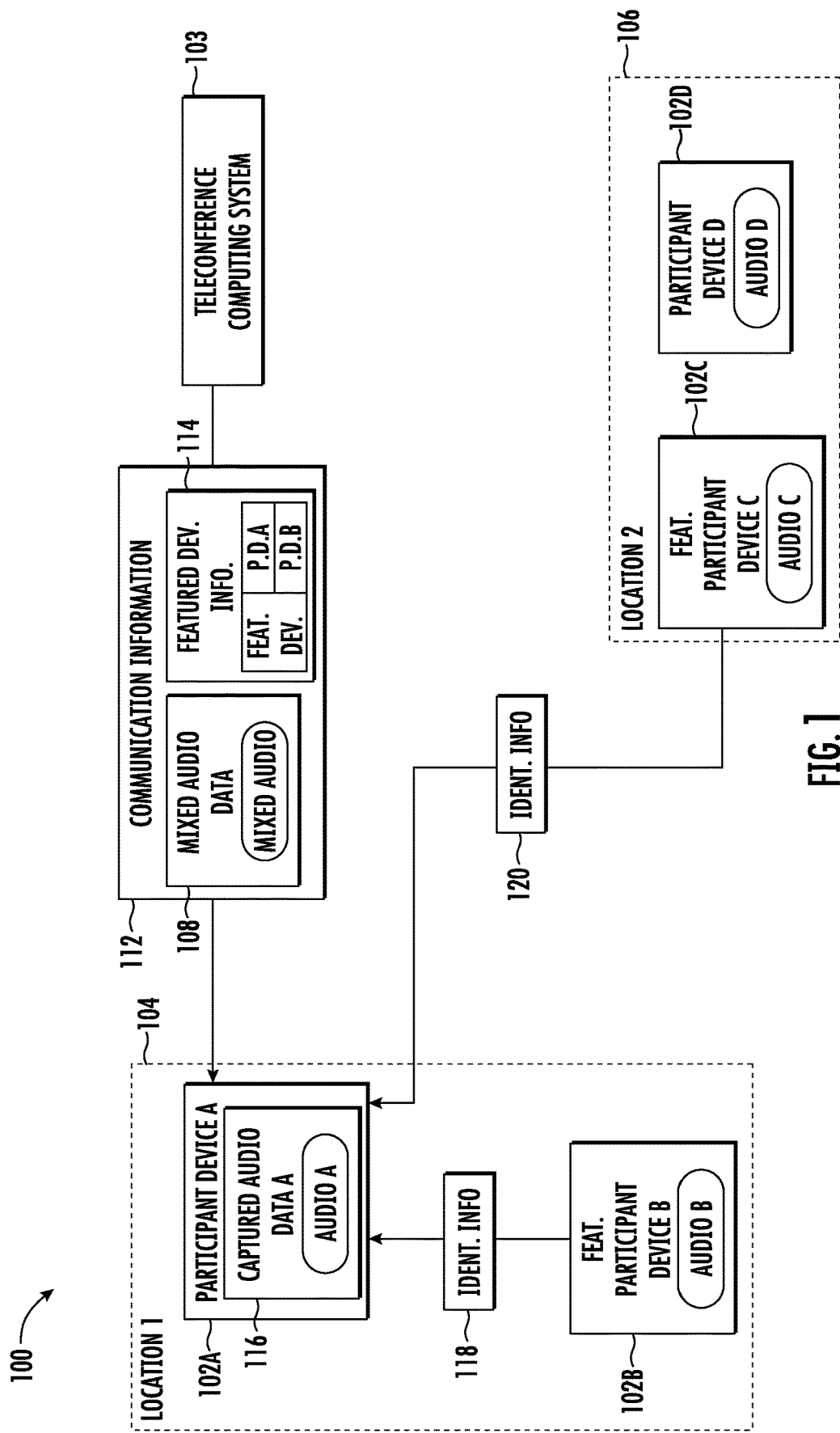
FIG. 1 depicts an overview data flow diagram for determining the identity of co-located devices according to some implementations of the present disclosure.

Reference numerals that are repeated across plural figures are intended to identify the same features in various implementations.

DETAILED DESCRIPTION

Generally, the present disclosure is directed to determining the identity of co-located devices once the occurrence of co-location is detected. More specifically, when two participant computing devices (e.g., smartphones, laptops, wearable devices, etc.) are co-located (e.g., located adjected to each other, located in the same room, etc.), audio captured by one device can be captured by the other device due to their proximity. This can lead to a feedback loop called "howling", in which the inadvertently captured audio is repeatedly played and re-captured both of the two co-located devices, quickly drowning out any other sound in teleconferencing session and rendering vocal communication nearly impossible.

Participant computing devices are generally capable of determining whether they are co-located with some other device that is connected to the same teleconferencing session. For example, a participant computing device can capture and store audio. Subsequently, the participant computing device can receive mixed audio from a teleconference system (e.g., a system hosting the teleconferencing session) that includes audio captured at the locations of a number of other devices connected to the session. The participant computing device can identify features in the mixed audio that are also present in the audio previously captured by the participant computing. Since the mixed audio is received subsequent to the audio captured by the device, the device can determine that it is co-located with some other device connected to the session (e.g., due to the delay required for the other device to transmit the audio, the teleconference system to mix and broadcast the audio, etc.).

However, the act of mixing audio often obscures the source of specific portions of the mixed audio, making it prohibitively difficult for a participant computing device to determine the identity of a co-located device from the mixed audio alone. As such, although participant computing devices can detect whether they are co-located with some other device, participant computing devices generally lack the capacity to determine which device they are co-located with. Without knowing the identity of a co-located device, a participant computing device cannot adequately perform corrective actions to eliminate, or reduce, the deleterious effects of audio feedback loops (such as "howling") caused by device co-location.

Accordingly, implementations of the present disclosure propose techniques to identify co-located devices once an occurrence of co-location is detected. For example, a participant computing device that is connected to a teleconferencing session can receive mixed audio data that includes audio from other devices that are also connected to the teleconferencing session. Based on the mixed audio, the participant computing device can detect that it is co-located with one (or more) of the other devices. The participant computing device can obtain information that identifies a subset of the other devices as being "featured" devices in the mixed audio (e.g., provided the most active audio signals, etc.). These "featured" devices can provide co-location information (e.g., a geographic location of the devices, local audio features, etc.) to the participant computing device, which the participant computing device can use to determine the featured device that it is co-located with. Once the co-located featured device is identified, the participant computing device can perform corrective actions, therefore eliminating, or reducing, audio feedback loops caused by co-location of the devices.

Aspects of the present disclosure provide a number of technical effects and benefits. As one example technical effect and benefit, co-located devices can cause audio feedback loops that disrupt live teleconferencing sessions, such as "howling". Without knowing the identities of co-located devices, audio feedback loops are difficult to suppress and/or eliminate, often requiring the expenditure of substantial computing resources. However, once the identities of co-located devices are known to each other, the co-located devices can perform corrective actions that only require a fraction of the computing resources required otherwise. Accordingly, by determining the identity of devices that are co-located, implementations of the present disclosure eliminate the use of substantial quantities of computing resources required to suppress audio feedback loops when the identities of co-located devices are unknown (e.g., power, memory, compute cycles, storage, etc.).

With reference now to the Figures, example implementations of the present disclosure will be discussed in further detail.

FIG. 1 depicts an overview data flow diagram 100 for determining the identity of co-located devices according to some implementations of the present disclosure. In particular, participant computing devices 102A, 102B, 102C, and 102D (generally, participant devices 102) can each be connected to a teleconferencing session (e.g., an audio conference, a videoconference, a multimedia conference, etc.) orchestrated by a teleconference computing system 103 (e.g., a server system hosting the session or overseeing peer-to-peer communications within the session, etc.). The participant devices 102 can be located across two locations. Participant computing devices 102A and 102B can be located in location 104 (a room, an office, a booth, etc.) and participant computing devices 102C and 102D can be located in location 106 (e.g., an office building, a large auditorium, etc.).

The teleconference computing system can receive transmissions of audio data from participant computing devices 102B, 102C, and 102D (e.g., audio data A, B, C, etc.). The teleconference computing system can mix the received audio data to obtain mixed audio data 108. The teleconference computing system can broadcast communication information 112 that includes the mixed audio data 108 to the participant computing device 102A. Additionally, the communication information 112 can include featured device information 114. The featured device information 114 can identify some of the participant devices 102 as "featured" devices that are primarily featured in the mixed audio.

Upon receipt of the communication information 114, the participant computing device 102A can compare the mixed audio data 108 with captured audio data 116 that was captured before receipt of the mixed audio data 108. For example, the participant computing device 102A can capture audio data 116 including a spoken utterance of the word "hello." Next (e.g., after 500 milliseconds, etc.), the participant computing device 102 can obtain the mixed audio data 108, which can also include the spoken utterance of the word "hello". Based on the comparison, the participant computing device 102A can determine that it is co-located with some other computing device that is also connected to the teleconferencing session. For example, the participant computing device 102A may identify features included in the audio of the captured audio data 116 are also present in the mixed audio of the mixed audio data 108 (e.g., features corresponding to the word "hello").

More specifically, if participant computing device 102A is co-located with another device, then the audio captured at that device (e.g., mixed into mixed audio data 108) must be received at a time subsequent to the time at which participant computing device 102A captured audio data 116. For example, assume that participant computing device 102A and 102B are co-located. Audio captured at participant computing device 102A would be concurrently captured at participant computing device 102B (e.g., due to their proximity). However, the audio then must be encoded by the participant computing device 102B, transmitted to the teleconference computing system 103, mixed with other transmitted audio, broadcast to the participant computing device 102A, etc. Each of these actions requires time. As such, if the mixed audio data 108 is received before, or at the same time the audio of the audio data 116 is captured, then any features shared must be caused by something other than co-location with another device, and the co-location detector 118 can determine that co-location has not occurred.

As described previously, it can be prohibitively difficult for the participant computing device 102A to determine the identity of the device it is co-located with based solely on the mixed audio data 108. However, to narrow the field of potentially co-located devices, the participant computing device 102A can obtain the featured device information 114 included in the communication information 112. The featured device information can indicate that some of the other devices are "featured" devices. Featured devices can be the devices that most actively contribute audio to the mixed audio data 108 (e.g., the "loudest" contributed audio, the greatest quantity of contributed audio above a threshold degree of activity, etc.). Specifically, as the participant computing device 102A initially detected co-location based on the mixed audio data 108, and the "featured" devices are necessarily responsible for most (or all) of the audio contributed to the mixed audio data 108, the participant computing device 102A can assume that the co-located device is a featured device.

To follow the depicted example, the featured device information 114 can indicate that participant computing devices 102B and 102C are featured devices (e.g., A/D: No, B/C: Yes). The participant computing device 102A can obtain co-location information 118 for the participant computing device 102B and co-location information 120 from the participant computing device 102C. Co-location information can be any type of information that directly (or indirectly) indicates whether a featured device is co-located with the participant computing device 102A. For example, the co-location information 118 can indicate a geographic location of the participant computing device 102B. For another example, the co-location information 118 can include features from audio captured at the participant computing device 102B so that the features can be compared to features of the audio captured by the participant computing device 102A. For yet another example, the co-location information 118 can indicate a local time at which the audio was captured at the participant computing device 102B.

Based on the co-location information 118 and 120, the participant computing device 102A can make a determination that it is co-located with the participant computing device 102B. Once the determination is made, the participant computing device 102A can perform corrective action(s) to reduce, or eliminate, any inefficiencies or reductions in signal quality caused by the co-location of the devices (e.g., informing participant computing device 102B, etc.). In such fashion, implementations of the present disclosure can detect and identify co-located devices within a teleconferencing session so that corrective action(s) can be taken to reduce, or prevent, any audio feedback loops that could occur due to co-location.

Figure 2:
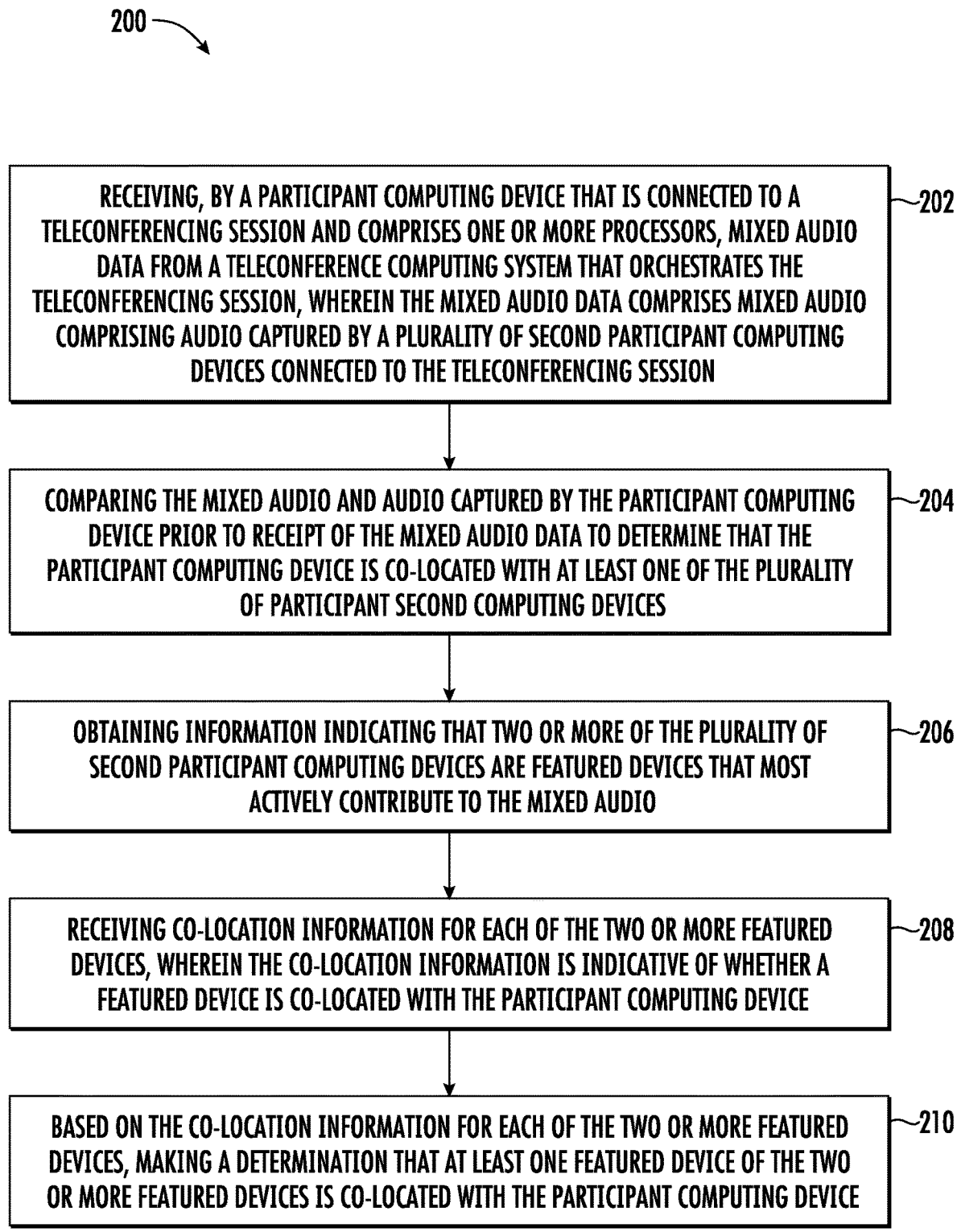
FIG. 2 is a flow diagram of an example method for minimizing echo caused by stereo audio via position-sensitive acoustic echo cancellation, in accordance with some embodiments of the present disclosure.

FIG. 2 is a flow diagram of an example method 200 for minimizing echo caused by stereo audio via position-sensitive acoustic echo cancellation, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by a co-located device identifier of the participant computing devices 102 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible The operations described herein can be performed by a participant computing device. As referred to herein, a participant computing device generally refers to any device that can be utilized by a participant (e.g., a user that is participating in the teleconferencing session) to connect to a teleconferencing session for the purposes of exchanging communication data (e.g., a smartphone, laptop computer, desktop computer, AR/VR headset, wearable device, purpose-built teleconferencing device, etc.). Any computing system(s) or computing device(s) will be discussed in greater detail with regards to participant computing device 502 and teleconference computing system 550 of FIG. 5.

In particular, the participant computing device described herein can be connected to a teleconferencing session. A teleconferencing "session" can refer to an active and ongoing session of a teleconference to which multiple computing devices and/or systems are connected and exchanging real-time communication data. A teleconference, as used herein, generally refers to any exchange of communication data (e.g., audio data, video data, AR/VR data, etc.) between multiple computing devices. The term "teleconference" can encompass videoconferences, audioconferences, media conferences (e.g., exchanging multiple types of communication data), an Augmented Reality (AR)/Virtual Reality (VR) conference, and/or other forms of the exchange of data (e.g., communications data) between participant computing devices.

At operation 202, processing logic of a participant computing device connected to a teleconferencing session can receive mixed audio data from a teleconference computing system that orchestrates the teleconferencing session. For example, the teleconference computing system (e.g., a cloud computing network, a server computing system, etc.) may receive communication information (e.g., audio data, video data, etc.) from participant computing devices, and mixes and broadcasts the data back to the participant computing devices. The mixed audio data can include mixed audio from multiple other participant computing devices connected to the teleconferencing session.

For example, the participant computing device, along with the other participant computing devices, can each be connected to the teleconferencing session. During the session, some (or all) of the other participant computing devices can exchange audio data that includes audio (e.g., spoken utterances from associated participants, etc.). The audio data from each participant device can be received at a teleconference computing system, which can mix the audio data to generate mixed audio data that includes mixed audio. More specifically, to efficiently broadcast audio data to the connected participant computing devices, the teleconference computing system can mix the audio data and send a single broadcast (i.e., "stream") of audio data to each participant computing device (e.g., a mix of all of the audio data minus the audio data transmitted by the receiving device), rather than separately relaying the audio data transmitted by each participant computing device.

In some implementations, the mixed audio data can be included in communication information sent by the teleconferencing computing system to the participant computing device. The communication information can include other types of information that can facilitate the identification of co-located device(s). For example, in addition to the mixed audio data, the communication information can include information indicating that some of the participant computing devices connected to the call are featured devices that most actively contribute to the mixed audio data (to be discussed in greater detail at operation 206). For another example, the communication information can include identifying information for some (or all) of the participant computing devices that are connected to the teleconferencing session (to be discussed in greater detail at operation 208).

At operation 204, the processing logic of the participant computing device can compare the mixed audio to audio captured by the participant computing device prior to receipt of the mixed audio. The comparison between the captured audio and the mixed audio can identify audio that is included in both the mixed audio and the captured audio. As audio included in both the mixed audio and the audio is very likely to be caused by co-location of devices, the participant computing device can determine whether or not it is co-located with other device(s) connected to the teleconferencing session based on the comparison.

More specifically, to participate in the teleconferencing session, the participant computing device can also capture audio for transmission to other participant computing devices. While capturing and transmitting audio, audio data that includes the captured audio can be stored by the participant computing device. The participant computing device can compare the captured audio to the mixed audio, which is received after the captured audio is stored. The comparison can identify whether any portion of the mixed audio originates from the same audio source as that of the audio captured at the participant computing device. For example, the captured audio can include a spoken utterance of the word "Greetings" from a participant using the participant computing device. The participant computing device can compare the captured audio and the mixed audio to determine whether the mixed audio also includes at least some of the spoken utterance of the word "Greetings." As the mixed audio received by the participant computing device does not include the captured audio (i.e., the participant's own "voice"), if any audio from the captured audio is included in the mixed audio then co-location is very likely to have occurred.

In some implementations, to compare the mixed audio and the audio captured by the participant computing device, the participant computing device can identify features included in both the captured audio and the mixed audio. For example, the participant computing device can generate representations of the audio and the mixed audio (e.g., spectrograms, etc.) and identify features in each representation (e.g., pairs of spectral peaks in a spectrogram). The computing system can then compare the representations to determine whether any of the identified features are shared between each representation.

In some implementations the participant computing device can process both the audio and the mixed audio with a machine-learned model that is trained to detect co-location. For example, the machine-learned model can be a lightweight model trained to process two sets of audio data to determine whether audio from a single audio source is included in both sets of audio data. Alternatively, in some implementations, the machine-learned model can be trained to process intermediate representations (e.g., a set of features) determined from the two sets of audio data to determine whether the audio from a single audio source is included in both sets of audio data. Alternatively, in some implementations, the machine-learned model can be trained to generate intermediate representations of the captured audio and the mixed audio for comparison by the participant computing device.

At operation 206, the processing logic of the participant computing device can obtain information that identifies two or more of the plurality of second participant computing devices as "featured" devices that most actively contribute to the mixed audio. Generally, featured devices are a subset of the participant computing devices connected to the teleconferencing session that most "actively" contribute to the mixed audio. The degree to which a device "actively contributes" to the mixed audio can be measured according to various audio characteristics. In some implementations, the degree of active contribution to the mixed audio can be measured by a volume of the audio contributed by the participant computing device at a specific point in time. For example, if audio from participant computing devices 1, 2, and 3 contribute audio with the highest volume (i.e., are the "loudest") at timestamp 0:01 of the mixed audio, then devices 1, 2, and 3 can be featured devices. If the devices that contribute audio with the highest volume change to devices 1, 4, and 5 at timestamp 0:02 of the mixed audio, devices 1, 4 and 5 can be featured devices while devices 2 and 3 lose their designation as featured devices. In other words, the participant devices designated to be featured devices can change rapidly throughout the mixed audio as different participants participate in a conversation.

Alternatively, in some implementations, the degree of active contribution to the mixed audio can be measured by a volume of the audio contributed by the participant computing device over a period of time. For example, if the audio of participant computing devices 1, 2, and 3 contribute audio with the highest volume (i.e., are the "loudest") over 5 seconds of the mixed audio, then devices 1, 2, and 3 can be featured devices for those 5 seconds, and designation of the featured devices can be re-evaluated for the next 5 seconds of the mixed audio. For another example, if the audio contributed by participant computing devices 1, 2, and 3 contribute the greatest length of audio above a threshold degree of volume over 10 seconds of the mixed audio, devices 1, 2, and 3 can be featured devices for those 10 seconds. More specifically, by measuring the length of audio contributed that is louder than a threshold degree of volume, it is more likely that purposefully contributed audio is measured (e.g., speaking a full sentence) rather than inadvertent (but loud) audio (e.g., knocking a can off a desk, a dog barking, etc.).

In some implementations, the specific time or time period used to identify participant computing devices as featured devices can be the time or time period in the mixed audio that shares features with the captured audio of the participant computing device. For example, seconds 0:01-0:02 of the mixed audio can include audio of a spoken utterance of the word "giraffe." The participant computing device can identify the audio features corresponding to the word "giraffe" as also being included in the captured audio. As such, the participant computing device can obtain information that indicates which participant computing devices are primary devices between seconds 0:01-0:02 of the mixed audio. It should be noted that the volume of the audio can be measured using any manner of metric that indicates the volume of audio (e.g., decibels (dB), decibels relative to full scale (dBFS), etc.).

In some implementations, the information indicating that the two (or more) participant computing devices are featured devices can be obtained by the participant computing device from the teleconference computing system. For example, in some implementations, the teleconference computing system can generate information that indicates which devices are featured devices at any specific time in the mixed audio, and can provide the information to the participant computing device (e.g., concurrent or subsequent to receiving the mixed audio data, etc.).

Alternatively, in some implementations, the information indicating that the participant computing devices are featured devices can be audio tracks included in the mixed audio data. The audio tracks can separate the audio contributed by each connected participant computing device, which allows the participant computing device to determine which participant computing devices are featured devices at a specific time. For example, the participant computing device can measure a decibel level of the audio contributed by each participant computing device over a period of time (e.g., the period of time in the mixed audio that includes the shared features, etc.).

In some implementations, the mixed audio can only include audio from featured devices while excluding audio from non-featured devices. For example, the teleconference computing system can determine that devices 1, 2, and 3 of 5 total devices are featured devices for a period of 5 seconds of the mixed audio. For those 5 seconds, the participant computing device can receive audio tracks for devices 1, 2, and 3, and mixed audio that includes audio contributed by devices 1, 2, and 3, while excluding audio from devices 4 and 5. If the teleconference computing system determines devices 2 and 4 to be featured devices for the subsequent 5 seconds of the mixed audio, the participant computing device can receive audio tracks for devices 2 and 4, and mixed audio that includes audio contributed by devices 2 and 4 while excluding audio from devices 1, 3, and 5.

At operation 208, the processing logic of the participant computing device can receive co-location information for each of the featured devices. The co-location information can be any type of information that directly, or indirectly, indicates whether the featured device is co-located with the participant computing device. For example, the co-location information can be encoded audio that, when captured by another participant computing device, identifies the featured device as a co-located device. More specifically, as co-located devices are generally within a perceptible range of each other, the encoded audio can be played at audio output devices connected to the featured device and can be received at the audio capture device of the participant computing device.

In some implementations, the co-location information can be information descriptive of audio captured at the featured device. For example, if the featured device has also detected co-location, then the featured device has identified shared features included in both the audio captured at the featured device and the mixed audio. The featured device can include the shared features in co-location information and provide the co-location information to the participant computing system. If the shared features included in the co-location information are the same as those identified by the participant computing device, the participant computing device can determine that it is co-located with the featured device.

Additionally, or alternatively, in some implementations, the co-location information can be information descriptive of a geographic location of the featured devices (e.g., a zip code, street address, longitude and latitude, etc.). For example, the teleconference computing system can inherently have access to location information for each of the connected participant computing devices. The teleconference computing system can provide co-location information to the participant computing device that indicates the geographic locations of the featured devices. For another example, the participant computing device (or the teleconference computing system) can instruct each featured device to provide co-location information to the participant computing device that indicates the geographic position of the featured device. If only one featured device is within a threshold co-location distance at which co-location is possible (e.g., within the same zip code, in the same city, the same city block, same building, etc.), the participant computing device can determine that it is co-located with that device.

Additionally, or alternatively, in some implementations, co-location information can be provided to the participant computing device by each featured device, and can indicate if co-location was detected by the featured device. More specifically, if one device is co-located with another, both devices are likely to detect co-location. As such, the non-detection of co-location by a featured device can be used as a filtering criteria for determining whether the device is co-located with the participant computing device. To follow the previous example, if two featured devices provide co-location information to the participant computing device indicating that they are both within a threshold co-location distance at which co-location is possible (e.g., both within the same building, etc.). One featured device can indicate that it detected co-location, while another featured device can indicate that it did not detect co-location. The participant computing device can use this information to make a determination that it is co-located with the featured device that also detected co-location.

Additionally, or alternatively, in some implementations, the co-location information can be, or otherwise include, the audio contributed by the featured devices to the mixed audio. For example, the participant computing device can determine that features included in the audio of the captured audio are also included in the seconds 0:03-0:05 of the mixed audio. The participant computing device can inform the teleconference computing system, and the teleconference computing system can provide co-location information that includes separate audio contributed by each featured device to seconds 0:03-0:05 of the mixed audio (or an intermediate representation of the audio). The participant computing device can compare the captured audio to the audio included in the co-location information to determine which of the featured devices are co-located with the participant computing device. Similarly, in some implementations, the co-location information can be obtained by comparing the captured audio with the audio data that each of the featured devices.

In some implementations, the co-location information can be a local identifying signal that identifies a featured device. For example, the featured device can transmit a conventional identifying signal (e.g., a Bluetooth signal, WiFi signal, etc.) to other devices located within a certain area of the featured device. In some implementations, the local identifying signal can be limited to an area of co-location with the participant computing device. For example, the local identifying signal may be an audible audio output signal played at the audio output devices of the featured device. The audio output signal can be played at a volume that can only be captured within an area of co-location. For another example, the audio output signal can be encoded audio that is configured to identify the featured device upon capture of the encoded audio.

In some implementations, the participant computing device can provide co-location information to the featured computing devices. More specifically, as the featured devices facilitate the participant computing device's identification of co-located devices, the participant computing device can also facilitate the featured devices identification of co-located devices.

At operation 210, based on the co-location information for each of the featured devices, the processing logic of the participant computing device can make a determination that one (or more) of the featured devices is co-located with the participant computing device. In some implementations, the co-location information for one featured device can be audio features that are also included in the audio captured by the participant computing device. For example, the participant computing device can identify a set of features in the audio captured by the participant computing device prior to receipt of the mixed audio. The participant computing device can determine that some (or all) of these features also occur in the mixed audio. As the features are shared between the audio captured by both devices, it is relatively likely that the devices are co-located, and as such, the participant computing device can make the determination that it is co-located with the featured device are co-located.

In some implementations, the co-location information for a featured device can indicate that it is located in a different geographic region than the participant computing device. For example, the participant computing device can be located in North America, and the co-location information can indicate that the featured device is located in Europe. Based on the co-location information, the participant computing device can determine that it is not co-located with the featured device.

In some implementations, based on the determination that the participant computing device is co-located with the featured device(s), the participant computing device can perform corrective action(s) to reduce, or eliminate, reductions in transmission quality caused by device co-location. For example, the participant computing device can send information to the teleconference computing system indicating that the participant computing device is co-located with the featured computing device(s). The teleconference computing system can then perform processing on future transmissions to eliminate any echo caused by co-location. For another example, the participant computing device can send information to the featured device(s) indicating that they are co-located. The featured device(s) can then inform users of the device(s) perform processing on audio captured at the device(s), etc. For example, the featured device, or the participant computing device, can generate an interface element within an interface of an associated teleconferencing application used to participate in the teleconferencing session that informs a participant of the co-location.

For another example, the participant computing device can process the mixed audio data prior to playback to filter the audio that is also included in the audio captured at the participant computing device. For yet another example, the participant computing device can disable an audio capture device and/or audio output device associated with the participant computing device to eliminate the risk of echo caused by device co-location.

Figure 3A:
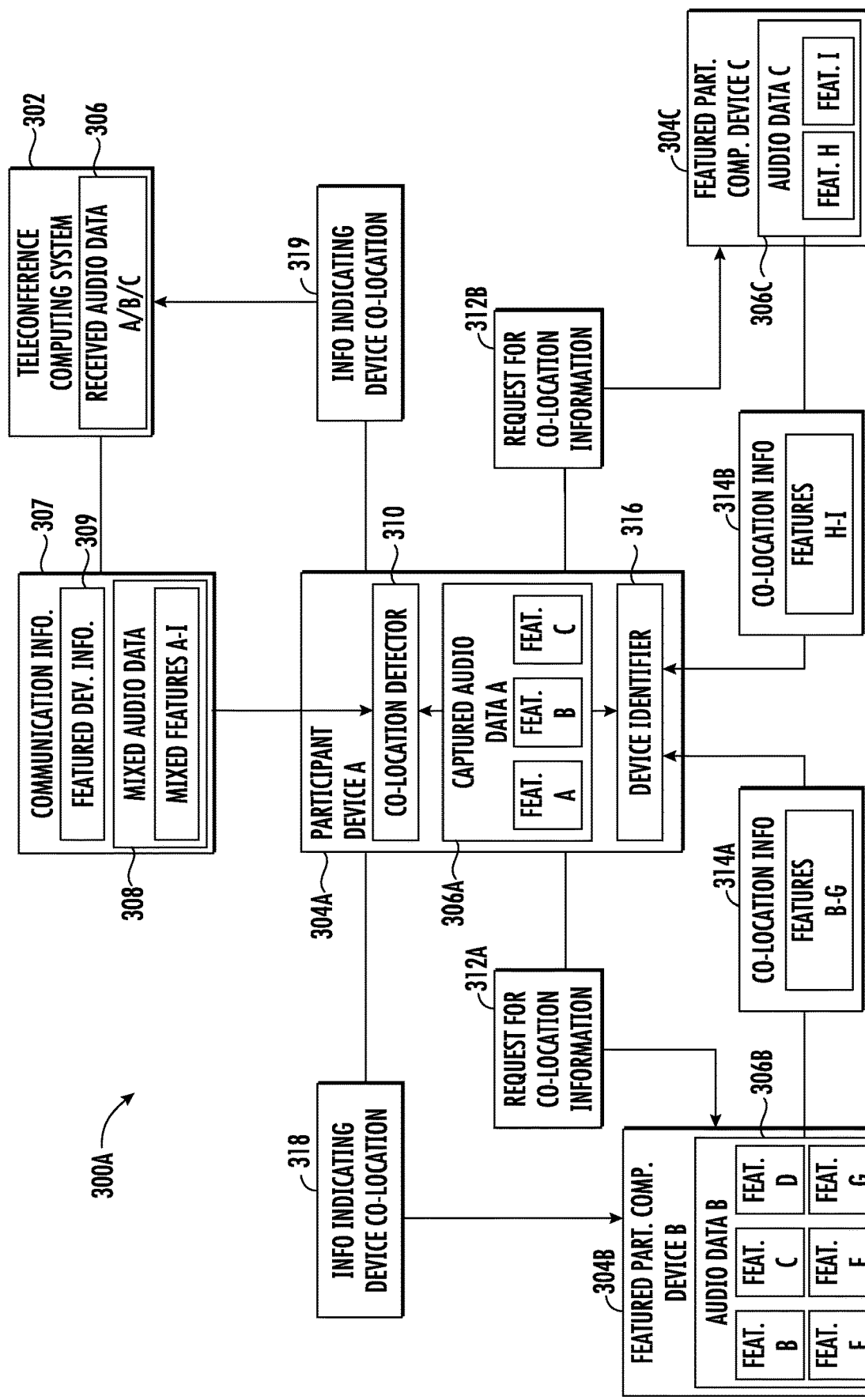
FIG. 3A depicts a more detailed data flow diagram for determining the identity of co-located devices according to some implementations of the present disclosure.

FIG. 3A depicts a more detailed data flow diagram 300A for determining the identity of co-located devices according to some implementations of the present disclosure. More specifically, teleconference computing system 302 can receive audio data 306A, 306B, and 306C from participant computing device 304A, 304B, and 304C that are each participating in a teleconferencing session. The teleconference computing system 302 can mix the received audio data, and can send communication information 307 to the participant computing device 304A that includes mixed audio data 308. The participant computing device 304A can use the co-location detector 310 to compare captured audio data 306A to the mixed audio data 308. More specifically, the participant computing device 304A can determine whether features of the captured audio data 306A, which is captured prior to receipt of the mixed audio data 308, are also included in the mixed audio data 308. For example, the mixed audio data 308 includes a mix of features (e.g., spectral peaks, etc.) from the audio data received by the teleconference computing system 302. As depicted, the audio data 306B captured by the participant computing device 304B can include features B, C, D, E, F, and G. The captured audio data 306A can include features A, B, and C. By comparing the captured audio data 306A and the mixed audio data 308, the participant computing device 304A can identify features of the captured audio data 306A that are included in the mixed audio data 308 (e.g., features A and B).

As described with regards to FIG. 1, the communication information 307 can also describe featured device information 309 indicating that two or more participant computing devices are featured devices that most actively contribute to the mixed audio. In some implementations, a "featured device" can be a device that most actively contributes to the mixed audio. For example, the featured devices can be the top three devices participating in the teleconferencing session that contribute the greatest quantity of active audio to the mixed audio (e.g., quantity of audio that is above a threshold degree of volume, quantity of audio that includes spoken utterances, etc.). For another example, the featured devices can be the top three devices participating in the teleconferencing session that contribute the loudest audio over a period of time.

Alternatively, in some implementations, a featured device can be a device that contributes active audio to the mixed audio that is above a threshold degree of audio activity. The threshold degree of audio activity can be any type, manner, or combination of audio activity metric(s) (e.g., volume, time above a threshold degree of volume, type or number of audio features, etc.). For example, the threshold degree of audio activity may be a quantity of audio contributed that is above a threshold degree of volume. For another example, the threshold degree of audio activity may be a quantity of audio features (e.g., spectral peaks, etc.) that correspond to human speech. As such, in some implementations, the number of featured devices can change based on the audio contributions of participating devices.

In some implementations, the featured devices can be evaluated for a subset of the mixed audio transmitted by the teleconference computing system. For example, three featured devices can be selected for each 5 second portion of the mixed audio data. For another example, the number and identity of featured devices can be evaluated every three seconds in the mixed audio data. As such, it should be broadly understood that the number of featured devices, and the devices identified as featured devices, can be different between specific points in the mixed audio.

Based on the detection of co-location, and the featured device information 309, the participant computing device 304A can assume that it is most likely co-located with one of the featured devices. As such, the participant computing device 304A can provide a request for co-location information 312 (e.g., requests for co-location information 312A and 312B) to the featured participant computing device 304B and the featured participant computing device 304C. In response, the featured participant computing device 304B and the featured participant computing device 304C can provide co-location information 314 (e.g., co-location information 314A and 314B) to the participant computing device 304A.

In some implementations, the co-location information 314 can include audio features identified in the audio captured at each respective featured device. For example, the featured participant computing device 304B can identify features B, C, D, E, F, and G in the audio data B captured at the featured participant computing device 304B. The featured participant computing device 304B can provide co-location information 314A that includes the audio features B-G. The participant computing device 304A can receive the co-location information 314A, and can use the device identifier 316 to identify that features B and C included in the co-location information 314A are also included in the captured audio data 306A, and therefore, that the participant computing device 304A is co-located with the featured participant computing device 304B. Similarly, the participant computing device 304A can receive the co-location information 314B, and can use the device identifier 316 to identify that none of the features H-I of the co-location information 314B are included in the co-location information 314A, and therefore, that the participant computing device 304A is not co-located with the featured participant computing device 304B.

In some implementations, once the participant computing device 304A identifies the device with which it is co-located, the participant computing device 304A can perform corrective actions. To follow the previous example, the participant computing device 304A can provide information 318 to the featured participant computing device 304B indicating that it is co-located with the participant computing device 304A. In some implementations, the information 318 indicating co-location can include the features identified to be shared with the audio data captured at the participant computing device 304A. More specifically, as the featured participant computing device 304B is co-located with the participant computing device 304A, the audio captured at the featured participant computing device 304B is also likely to share features with the mixed audio data 308. As such, by informing the featured participant computing device 304B of the shared features, the participant computing device 304A can enable the featured participant computing device 304B to filter the shared features from the mixed audio data 308 before local playback.

Additionally, or alternatively, in some implementations, the participant computing device 304A can provide information 319 to the teleconference computing system 302 indicating that it is co-located with the featured participant computing device 304B. More specifically, by providing the information 319 to the teleconference computing system 302 indicating co-location, the teleconference computing system 302 can perform corrective actions to remedy the co-location or any inefficiencies caused by co-location (e.g., instructing the featured participant computing device 304B to inform an associated participant of co-location, temporarily muting the featured participant computing device 304B, etc.).

Figure 3B:
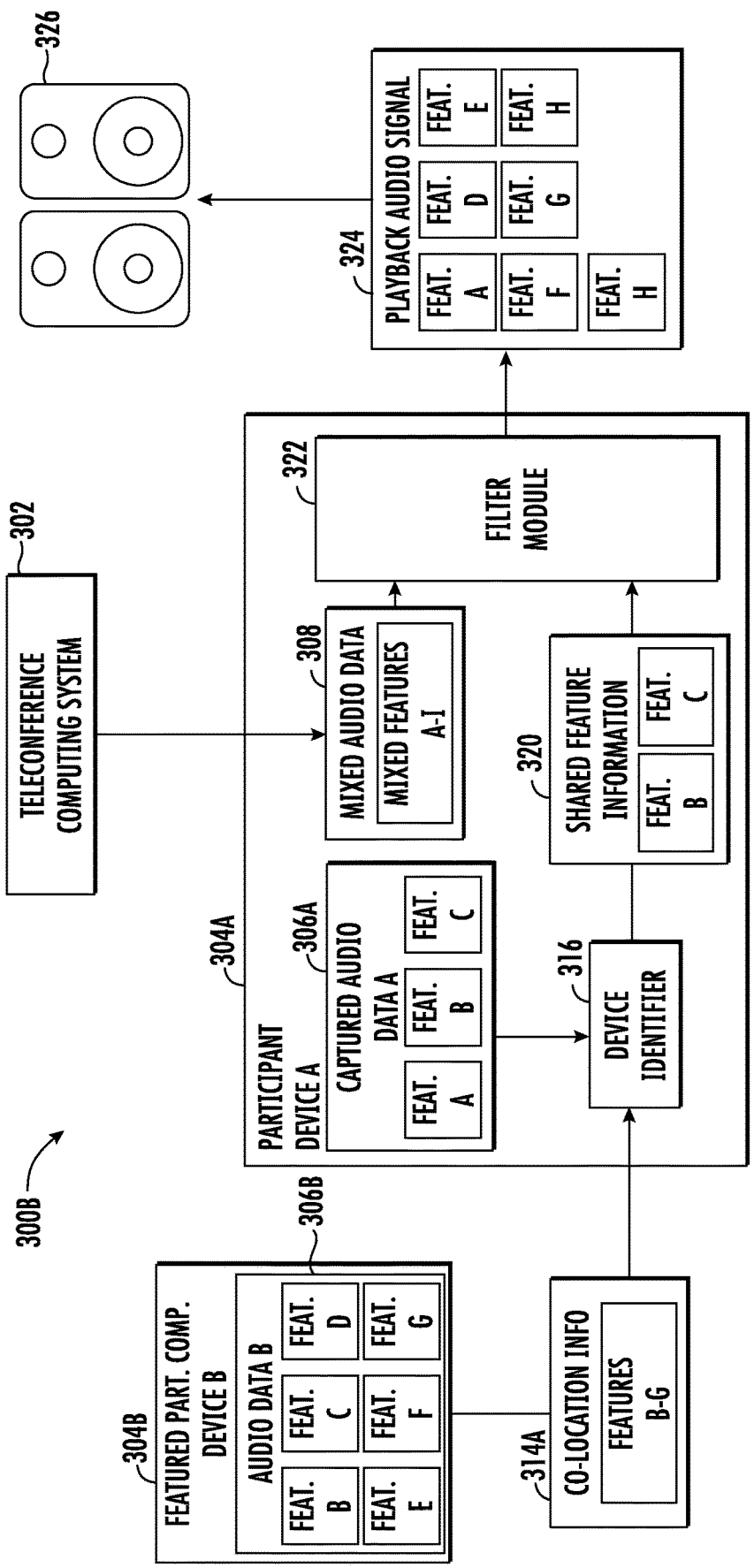
FIG. 3B depicts a data flow diagram for performing corrective filtering actions responsive to determining the identity of a co-located participant computing device according to some implementations of the present disclosure.

Additionally, or alternatively, in some implementations, the participant computing device 304A can filter the audio contributed by the featured participant computing device 304B from the mixed audio data 308 before playback of the mixed audio data 308. For example, turning to FIG. 3B, FIG. 3B is a data flow diagram for performing corrective filtering actions responsive to determining the identity of a co-located participant computing device according to some implementations of the present disclosure. More specifically, as the participant computing device 304A identifies the shared features between the audio included in the co-location information 314A and the captured audio data 306A with the device identifier 316, the participant computing device 304A can generate shared feature information 320. Shared feature information 320 can include, or otherwise indicate, the audio features shared between the captured audio data 306A and the audio data captured at the featured participant computing device 304B.

The participant computing device 304A can provide the shared feature information 320 to filter module 322. The filter module 322 can process the shared feature information 320 to filter the shared features from the mixed audio data 308 before playback. In some implementations, the filter module 322 can be an acoustic echo cancellation (AEC) module including linear and non-linear components. The participant computing device 304A can provide the shared feature information 320 to the non-linear portion of the AEC module to eliminate the shared features identified by the shared feature information 320 from the mixed audio data 308.

To follow the depicted example, the shared feature information 320 can indicate features B and C as shared features. The filter module 322 can process the shared feature information 320 to remove features B and C from the mixed audio data 308. Once features are filtered from the mixed audio data 308, the participant computing device 304B can send a playback audio signal 324 to audio playback devices 326 that includes each of the features of the mixed audio data 308 except the shared features identified by the shared feature information 320.

Figure 4A:
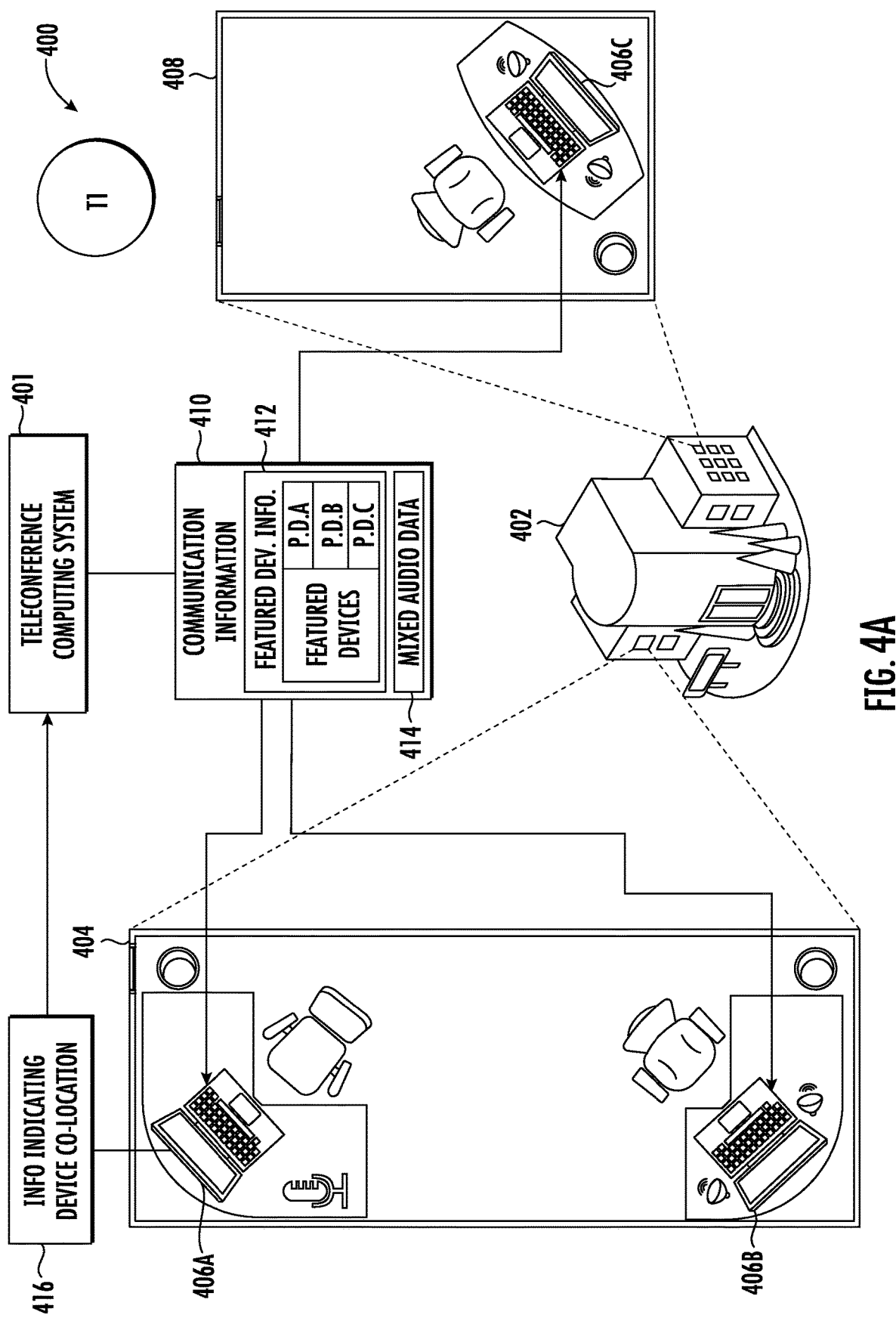
FIG. 4A illustrates example teleconferencing environments from which a participant computing device determines an identity of a co-located participant computing device using local identity signaling at a first time T1 according to some implementations of the present disclosure.

FIG. 4A illustrates example teleconferencing environments 400 from which a participant computing device determines an identity of a co-located participant computing device using local identity signaling at a first time T1 according to some implementations of the present disclosure. More specifically, building 402 can be a relatively large, multi-floored office building in which multiple team members participate in a teleconferencing session orchestrated by teleconference computing system 401 from within different locations in the building. Location 404 is a room in which two participants participate in the teleconferencing session using participant computing devices 406A and 406B. Location 408 is a second room on a different floor than location 404. A participant participates in the teleconferencing session from location 408 using participant computing device 406C.

As described with regards to FIG. 3A, at time T1 the teleconference computing system 401 can provide communication information 410 that includes featured device information 412 and mixed audio data 414. The mixed audio data can be a mix of audio data received from participant computing devices 406A, 406B, and 406C. The featured device information 412 can identify some participant computing devices connected to the teleconferencing session as being featured devices. Specifically, to follow the depicted example, the featured device information 412 can identify participant computing devices 406A, 406B, and 406C as being featured participant computing devices.

The participant computing device 406A can receive the communication information 410 and determine that it is co-located with some other participant computing device connected to the teleconferencing session as described with regards to FIG. 3A. The participant computing device 406A can provide information 416 indicating that co-location has been detected with an unidentified device to the teleconference computing system 401.

As described previously, in some implementations, the participant computing device 406A can identify a co-located device based on the geographic area of featured participant computing devices. For example, if the featured device information 412 indicated participant computing devices 406B and 406C as featured devices, and only participant computing device 406B was located in the same geographic area as participant computing device 406A, then participant computing device 406A can assume that participant computing device 406B must necessarily be the device with which it is co-located.

However, in scenarios where the participant computing device 406A and multiple featured devices are all located within the same geographic area, the participant computing device 406A must utilize alternative techniques to determine the identity of co-located participant computing device(s). More specifically, to follow the depicted example, it is very unlikely that participant computing devices 406B and 406C can indicate their location to a degree of specificity sufficient for identification of co-located devices (e.g., the specific room or floor of the office building 402. Rather, each of participant computing devices 406A, 406B, and 406C will indicate that they are located in the same geographic area (e.g., zip code, address, etc.).

Figure 4B:
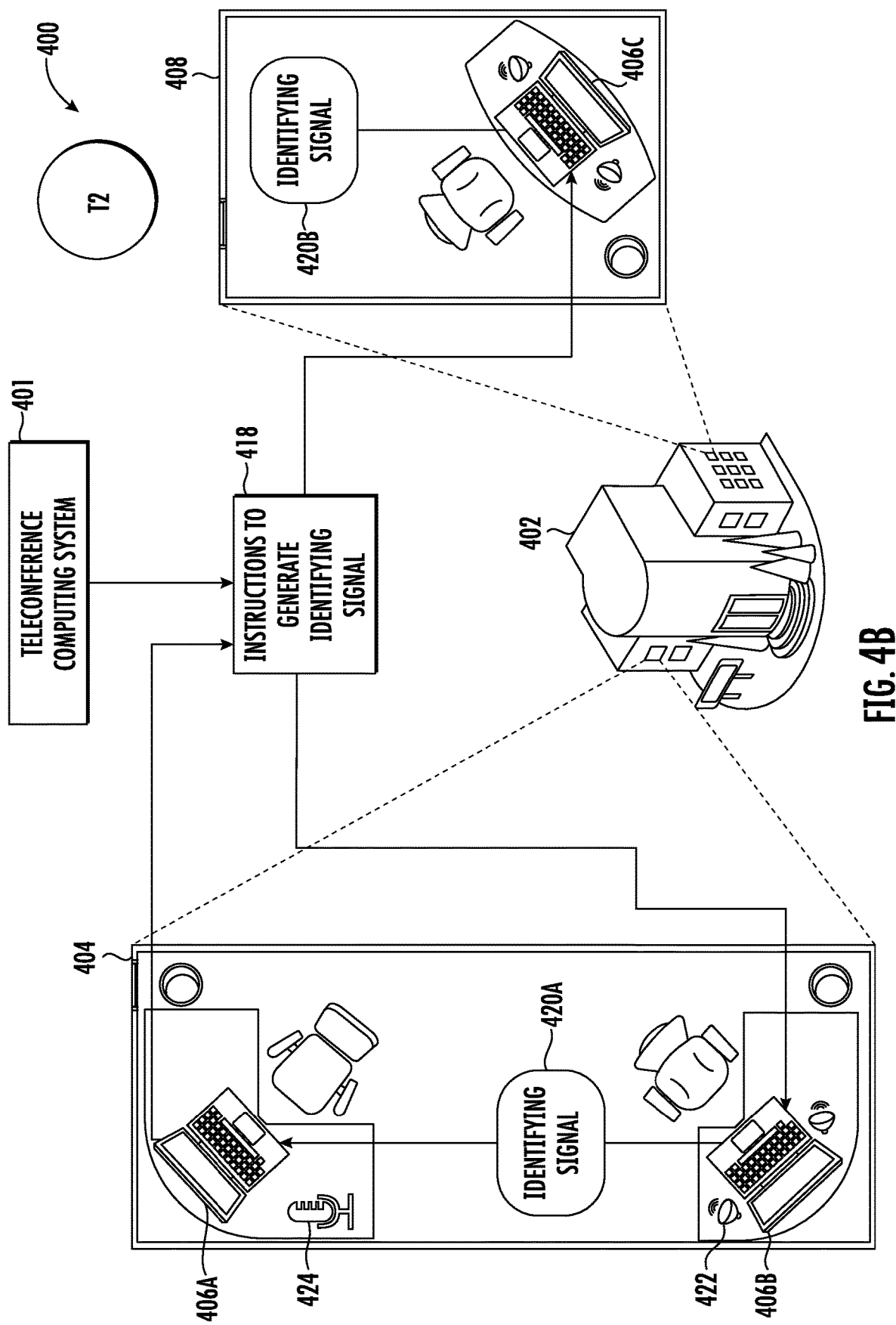
FIG. 4B illustrates example teleconferencing environments from which the participant computing device determines the identity of the co-located participant computing device using local wireless signaling at a second time T2 according to some implementations of the present disclosure.

As such, rather than identifying co-located devices using geographic area, the participant computing device 406A can utilize local identity signaling to identify co-located participant computing devices. For example, turning to FIG. 4B, FIG. 4B illustrates example teleconferencing environments 400 from which the participant computing device determines the identity of the co-located participant computing device using local wireless signaling at a second time T2 according to some implementations of the present disclosure. More specifically, the participant computing device 406A can determine that featured participant computing devices 406B and 406C are located in the same geographic region as the participant computing device 406A (e.g., based on information provided from the teleconference computing system 401, the participant computing devices 406B and 406C, etc.). In response, at a time T2 after time T1, the participant computing device 406A can provide instructions 418 to participant computing devices 406B and 406C to generate an identifying signal that identifies the respective participant computing device.

Alternatively, in some implementations, the teleconference computing system 401 can provide the instructions 418 to generate the identifying signal that identifies the respective participant computing device. More specifically, the teleconference computing system 401 can have information that indicates the geographic area of each of the participant computing devices. Upon receipt of the information 416 indicating the detection of co-location from the participant computing device 406A, the teleconference computing system can determine that the generation of identifying signals is necessary due to the geographic proximity of the participant computing devices 406A, 406B, and 406C.

Responsive to receiving the instructions 418 to generate the identifying signal, participant computing devices 406B and 406C and generate identifying signals 420A and 420B. The identifying signals 420A and 420B can be any type or manner of identity signaling. In some implementations, the identifying signal can be an audio signal played using audio output devices. For example, the participant computing device can generate an encoded audio signal that is configured to identify the participant computing device 406B. The participant computing device 406B can cause playback (e.g., perceptible, imperceptible, etc.) of the encoded audio signal using associated audio output devices 422, and the playback of the encoded audio signal can be captured at the audio capture device 424 of the participant computing device 406A.

Alternatively, in some implementations, the identifying signal can be a wireless signal generated using conventional wireless signaling techniques. For example, the identifying signal 420A can be a wireless signal (e.g., Bluetooth, Bluetooth Low Energy (BLE), WiFi, UltraWideBand (UWB), 802.15.4-based wireless signaling, Radio Frequency Identification (RFID), etc.) that is limited to a relatively small area. In some implementations, the identifying signal 420A can be a wireless signal for which reception is limited to an area of co-location.

More specifically, initial co-location is detected due to an audio source being captured by two closely located participant computing devices (e.g., participant computing devices 406A and 406B). Playback of an audio output identifying signal is, by nature, limited to an area in which co-location is likely (i.e., the area at which both participant computing devices 406A and 406B can capture audio data). However, as the geographic locations of participant computing devices 406A, 406B, and 406C are the same, the wireless identifying signal can also be limited to the range at which co-location is likely. By limiting the range at which the wireless signal can be received to an area that is similar to the range at which the participant computing devices 406A and 406B can capture audio, the participant computing device 406A can more accurately determine the identity of the co-located participant computing device.

To follow the depicted example, the identifying signals 420A and 420B can be generated in a manner such that the signals can only be detected (i.e., received) within an area that is similar to the area at which the participant computing device 406A can capture audio (e.g., the area of a room, etc.). For example, the identifying signal 420 can be configured to only be detectable (i.e., receivable) within a certain distance of the participant computing device 406B. Due to this limitation, the participant computing device 406A will detect the identifying signal 420A, but will fail to detect the identifying signal 420B. Based on the detection of the identifying signal 420A, the participant computing device 406A can make a determination that it is co-located with participant computing device 406B. In such fashion, local identity signaling can be utilized to determine the identity of co-located devices located within the same geographic area.

Figure 5:
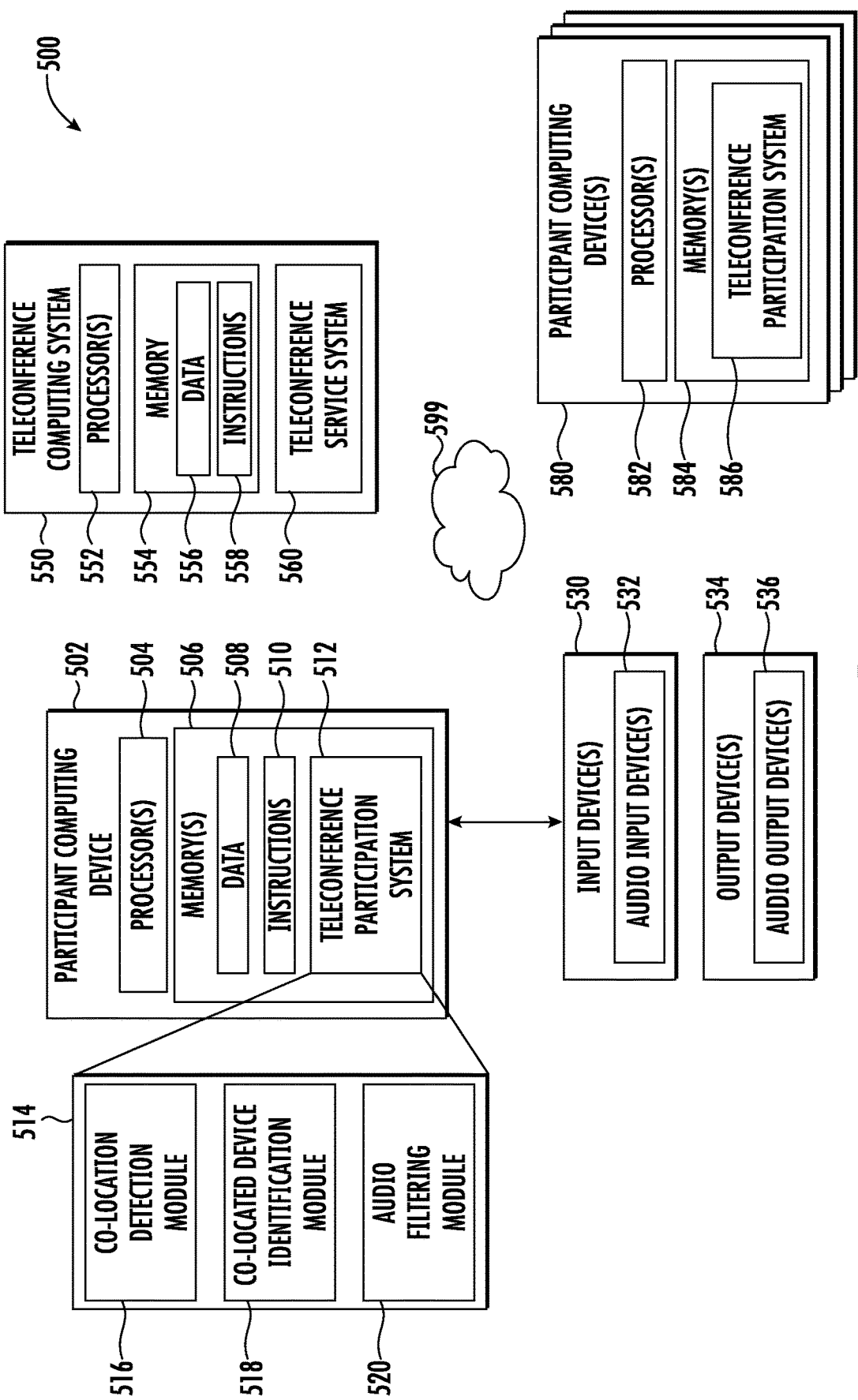
FIG. 5 depicts a block diagram of an example computing environment that performs detection and identification of co-located devices according to example implementations of the present disclosure.

FIG. 5 depicts a block diagram of an example computing environment 500 that performs detection and identification of co-located devices according to example implementations of the present disclosure. The computing environment 500 includes a participant computing device 502 that is associated with a participant in a teleconference, a teleconference computing system 550, and, in some implementations, other participant computing device(s) 580 respectively associated with other participants(s) in the teleconference.

The participant computing device 502 can be any type of computing device that can connected to a teleconference and facilitate participation in the teleconference, such as, for example, a personal computing device (e.g., laptop or desktop), a mobile computing device (e.g., smartphone or tablet), a gaming console or controller, a wearable computing device (e.g., a virtual/augmented reality device, etc.), an embedded computing device, a broadcasting computing device (e.g., a webcam, etc.), etc.

The participant computing device 502 includes processor(s) 504 and memory(s) 506. The processor(s) 504 can be any suitable processing device (e.g., a processor core, a microprocessor, an ASIC, an FPGA, a controller, a microcontroller, etc.) and can be one processor or processors that are operatively connected. The memory 506 can include non-transitory computer-readable storage media(s), such as RAM, ROM, EEPROM, EPROM, flash memory devices, magnetic disks, etc., and combinations thereof. The memory 506 can store data 508 and instructions 510 which are executed by the processor 504 to cause the participant computing device 502 to perform operations.

In particular, the memory 506 of the participant computing device 502 can include a teleconference participation system 512. The teleconference participation system 512 can facilitate participation in a teleconference by a participant associated with the participant computing device 502 (e.g., a teleconference hosted or otherwise orchestrated by teleconference computing system 550, etc.). To facilitate teleconference participation, the teleconference participation system 512 can include service module(s) 514 which, by providing various services, can collectively facilitate participation in a teleconference. Each of the service module(s) can be provided using any type, manner, or combination of software instructions and/or physical/virtualized hardware resources (e.g., processors, memory(s), virtualized device(s), etc.).

For example, the teleconference service module(s) 514 can include a co-location detection module 516. The co-location detection module 516 can detect whether a participant computing device is co-located with any other participant computing devices connected to the same teleconferencing session. More specifically, the co-location detection module 516 can process audio data captured by the participant computing device 502, and mixed audio data received from teleconference computing system 550, to determine whether the participant computing device 502 is co-located with any of the participant computing device(s) 580. For example, the co-location detection module 516 can identify features in the audio captured by participant computing device 502 (e.g., spectral peaks) and features in the mixed audio. The co-location detection module 516 can then determine whether any features of the captured audio are shared by the mixed audio.

For another example, the teleconference service module(s) 514 can include a co-located device identification module 518. If the co-location detection module 516 has detected that the participant computing device 502 is co-located with one or more of the participant computing device(s) 580, the co-located device identification module 518 can identify which of the participant computing device(s) 580 the participant computing device 502 is co-located with. For example, the co-located device identification module 518 can instruct the participant computing device(s) to generate identifying signals. For another example, the co-located device identification module 518 can instruct the participant computing device(s) 580 to provide co-location information to the participant computing device 502 (e.g., either directly through network(s) 599 or indirectly through the teleconference computing system 550.

The co-located device identification module 518 can utilize co-location information received from the participant computing device(s) 580 to determine the identity of the co-located device(s) as described with regards to FIGS. 1-4B.

For another example, the teleconference service module(s) 514 can include an audio filtering module 520. The audio filtering module 520 can filter audio contributed by the co-located participant computing device(s) 580 prior to playback of any audio output data as described with regards to FIGS. 3A-3B.

The participant computing device 502 can also include input device(s) 530 that receive inputs from a participant, or otherwise capture data associated with a participant. For example, the input device(s) 530 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 502 can include, or can be communicatively coupled to, input device(s) 530. For example, the input device(s) 530 can include a camera device that can capture two-dimensional video data of a participant associated with the participant computing device 502 (e.g., for broadcasting, etc.). In some implementations, the input device(s) 530 can include a number of camera devices communicatively coupled to the participant computing device 502 that are configured to capture image data from different perspectives for generation of three-dimensional pose data/representations (e.g., a representation of a user of the participant computing device 502, etc.).

In some implementations, the input device(s) 530 can include sensor devices configured to capture sensor data indicative of movements of a participant associated with the teleconference computing system 502 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In particular, the input device(s) 530 can include audio input device(s) 532 (e.g., microphones, microphone arrays, etc.). For example, the audio capture device(s) 532 can be, or otherwise include, a microphone array that captures high-quality audio data and provides the data as an audio input signal. For another example, the audio capture device(s) 532 can be a directional microphone that captures audio and a direction from which the audio was captured.

In some implementations, the participant computing device 502 can include, or be communicatively coupled to, output device(s) 534. Output device(s) 534 can be, or otherwise include, device(s) configured to output audio data, image data, video data, etc. For example, the output device(s) 534 can include a two-dimensional display device (e.g., a television, projector, smartphone display device, etc.). For another example, the output device(s) 534 can include display devices for an augmented reality device or virtual reality device.

In particular, the output device(s) 534 can include audio output device(s) 536. The audio output device(s) 536 can be any type or manner of audio device that can create, or otherwise simulate, stereo audio. For example, the audio output device(s) 536 can be a wearable audio output device (e.g., wired or wireless headphones, earbuds, bone conduction headphones, portable stereo simulation speakers, etc.). For another example, the audio output device(s) 536 can be multiple discrete audio output devices within a single audio output device (e.g., a soundbar device that simulates stereo audio). For yet another example, the audio output device(s) 536 can be separate audio output devices that produce stereo audio (e.g., multiple networked passive speakers, a wireless mesh speaker setup, etc.).

In some implementations, the output device(s) 534 include identity signaling devices that output signals that identify the participant computing device 502. For example, the identity signaling devices can be wireless signaling devices (e.g., Bluetooth, Bluetooth Low Energy (BLE), WiFi, UltraWideBand (UWB), 802.15.4-based wireless signaling, Radio Frequency Identification (RFID), etc.). For another example, the identity signaling devices can be the audio output devices 536.

The teleconference computing system 550 includes processor(s) 552 and a memory 554. The processor(s) 552 can be any suitable processing device (e.g., a processor core, a microprocessor, an ASIC, an FPGA, a controller, a microcontroller, etc.) and can be one processor or processors that are operatively connected. The memory 554 can include non-transitory computer-readable storage media(s), such as RAM, ROM, EEPROM, EPROM, flash memory devices, magnetic disks, etc., and combinations thereof. The memory 554 can store data 556 and instructions 558 which are executed by the processor 552 to cause the teleconference computing system 550 to perform operations.

In some implementations, the teleconference computing system 550 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 550 can be, or otherwise include, physical processing devices, such as processing nodes within a cloud computing network (e.g., nodes of physical hardware resources).

The teleconference computing system 550 can facilitate the exchange of communication data within a teleconference using the teleconference service system 560. More specifically, the teleconference computing system 550 can utilize the teleconference service system 560 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 550 can utilize the teleconference service system 560 to handle any frontend or backend services directed to providing a teleconference. For example, the teleconference service system 560 can receive and broadcast (i.e., relay) data (e.g., video data, audio data, etc.) between the participant computing device 502 and participant computing device(s) 580. For another example, the teleconference service system 560 can facilitate direct communications between the participant computing device 502 and participant computing device(s) 580 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 560 can provide a videoconference service for multiple participants. One of the participants can transmit audio and video data to the teleconference service system 560 using a participant device (e.g., participant computing device 502, etc.). A different participant can transmit audio data to the teleconference service system 560 with a different participant computing device. The teleconference service system 560 can receive the data from the participants and broadcast the data to each computing system.

As another example, the teleconference service system 560 can implement an augmented reality (AR) or virtual reality (VR) conferencing service for multiple participants. One of the participants can transmit AR/VR data sufficient to generate a three-dimensional representation of the participant to the teleconference service system 560 via a device (e.g., video data, audio data, sensor data indicative of a pose and/or movement of a participant, etc.). The teleconference service system 560 can transmit the AR/VR data to devices of the other participants. In such fashion, the teleconference service system 560 can facilitate any type or manner of teleconferencing services to multiple participants.

It should be noted that the teleconference service system 560 can facilitate the flow of data between participants (e.g., participant computing device 502, participant computing device(s) 580, etc.) in any manner that is sufficient to implement the teleconference service. In some implementations, the teleconference service system 560 can be configured to receive data from participants, decode the data, encode the data, broadcast the data to other participants, etc. For example, the teleconference service system 560 can receive encoded video data from the participant computing device 502. The teleconference service system 560 can decode the video data according to a video codec utilized by the participant computing device 502. The teleconference service system 560 can encode the video data with a video codec and broadcast the data to participant computing devices.

In some implementations, the teleconference computing system 550 includes, or is otherwise implemented by, server computing device(s). In instances in which the teleconference computing system 550 includes multiple server computing devices, such server computing devices can operate according to sequential computing architectures, parallel computing architectures, or some combination thereof.

In some implementations, the transmission and reception of data by teleconference computing system 550 can be accomplished via the network 599. For example, in some implementations, the participant computing device 502 can capture video data, audio data, multimedia data (e.g., video data and audio data, etc.), sensor data, etc. and transmit the data to the teleconference computing system 550. The teleconference computing system 550 can receive the data via the network 599.

In some implementations, the teleconference computing system 550 can receive data from the participant computing device 502 and 580 according to various encryption scheme(s) (e.g., codec(s), lossy compression scheme(s), lossless compression scheme(s), etc.). For example, the participant computing device 502 can encode audio data with an audio codec, and then transmit the encoded audio data to the teleconference computing system 550. The teleconference computing system 550 can decode the encoded audio data with the audio codec. In some implementations, the participant computing device 502 can dynamically select between a number of different codecs with varying degrees of loss based on conditions (e.g., available network bandwidth, accessibility of hardware/software resources, etc.) of the network 599, the participant computing device 502, and/or the teleconference computing system 550. For example, the participant computing device 502 can dynamically switch from audio data transmission according to a lossy encoding scheme to audio data transmission according to a lossless encoding scheme based on a signal strength between the participant computing device 502 and the network 599.

The teleconference computing system 550 and the participant computing device 502 can communicate with the participant computing device(s) 580 via the network 599. The participant computing device(s) 580 can be any type of computing device(s), such as, for example, a personal computing device (e.g., laptop or desktop), a mobile computing device (e.g., smartphone or tablet), a gaming console or controller, a wearable computing device (e.g., a virtual/augmented reality device, etc.), an embedded computing device, a broadcasting computing device (e.g., a webcam, etc.), or any other type of computing device.

The participant computing device(s) 580 includes processor(s) 582 and a memory 584 as described with regards to the participant computing device 502. Specifically, the participant computing device(s) 580 can be the same, or similar, device(s) as the participant computing device 502. For example, the participant computing device(s) 580 can each include a teleconference participation system 586 that includes at least some of the modules 514 of the teleconference participation system 512. For another example, the participant computing device(s) 580 may include, or may be communicatively coupled to, the same type of input and output devices as described with regards to input device(s) 530 and output device(s) 534 (e.g., device(s) 532, device(s) 536, etc.). Alternatively, in some implementations, the participant computing device(s) 580 can be different devices than the participant computing device 502, but can also facilitate teleconferencing with the teleconference computing system 550. For example, the participant computing device 502 can be a laptop and the participant computing device(s) 580 can be smartphone(s).

The network 599 can be any type of communications network, such as a local area network (e.g., intranet), wide area network (e.g., Internet), or some combination thereof and can include any number of wired or wireless links. In general, communication over the network 599 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

In some implementations, a broadcast can be, or otherwise include, wireless signaling that carries data, such as communications data, received in a transmission from a participant computing device. Additionally, or alternatively, in some instances, a broadcast can carry data obtained from a data store, storage device, content provider, application programming interface (API), etc. For example, a central entity can receive transmissions of audio data from a number of participant computing devices. The central entity can broadcast the audio data alongside video data obtained from a video data repository. As such, the broadcast of data is not limited to data received via transmissions from participant computing devices within the context of a teleconference.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Cloud: as used herein, the term "cloud" or "cloud computing environment" generally refers to a network of interconnected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/ Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
receiving, by a computing device that is connected to a communication session and comprises one or more processors, mixed audio data comprising mixed audio comprising audio captured by a plurality of second computing devices communicating with the computing device;
comparing, by the computing device, the mixed audio and audio captured by the computing device prior to receipt of the mixed audio data, to determine that the computing device is co-located with at least one of the plurality of second computing devices;

obtaining, by the computing device, information indicating that two or more of the plurality of second computing devices are featured devices that each contributed more than a threshold quantity of audio to the mixed audio;

receiving, by the computing device, co-location information determined by each of the two or more featured devices, wherein the co-location information is indicative of whether a featured device is co-located with the computing device; and based on the co-location information for each of the two or more featured devices, making, by the computing device, a determination that at least one featured device of the two or more featured devices is co-located with the computing device.

2. The computer-implemented method of claim 1, wherein the method further comprises performing, by the computing device, a corrective action in response to making the determination that at least one featured device of the two or more featured devices is co-located with the computing device.

3. The computer-implemented method of claim 2, wherein performing the corrective action in response to making the determination that at least one featured device of the two or more featured devices is co-located with the computing device comprises:
sending, by the computing device, information indicating that the computing device is co-located with the at least one featured device to a computing system associated with the communication session.

4. The computer-implemented method of claim 2, wherein performing the corrective action in response to making the determination that at least one featured device of the two or more featured devices is co-located with the computing device comprises:
sending, by the computing device, information indicating that the computing device is co-located with the at least one featured device to each of the at least one featured device.

5. The computer-implemented method of claim 2, wherein performing the corrective action comprises:
filtering, by the computing device, audio contributed by the at least one featured device from the mixed audio prior to playback of the mixed audio at an audio playback device associated with the computing device.

6. The computer-implemented method of claim 2, wherein performing the corrective action comprises:
disabling, by the computing device, at least one of an audio capture device associated with the computing device or an audio output device associated with the computing device.

7. The computer-implemented method of claim 2, wherein performing the corrective action comprises:
generating, by the computing device within an interface of a communication application associated with the communication session, an interface element indicative of co-location with the at least one featured device.

8. The computer-implemented method of claim 1, wherein receiving the co-location information comprises:
receiving, by the computing device, co-location information descriptive of a geographic location of each of the two or more featured devices.

9. The computer-implemented method of claim 1, wherein comparing the mixed audio and the audio captured by the computing device prior to receipt of the mixed audio to determine that the computing device is co-located with at least one of the plurality of second computing devices comprises:
identifying, by the computing device, a set of features in the audio captured by the computing device prior to receipt of the mixed audio; and
determining, by the computing device, an occurrence of one or more of the set of features in the mixed audio.

10. The computer-implemented method of claim 9, wherein obtaining the information indicating that the two or more of the plurality of second computing devices are featured devices comprises:
receiving, by the computing device, two or more sets of features from audio contributed to the mixed audio by the two or more featured devices; and
wherein making the determination that the at least one featured device of the two or more featured devices is co-located with the computing device comprises:
determining, by the computing device, that a feature of the set of features in the audio captured by the computing device is included in the set of features from the audio contributed by the at least one featured device.

11. The computer-implemented method of claim 1, wherein obtaining the information indicating that two or more of the plurality of second computing devices are the featured devices comprises:
sending, by the computing device, information descriptive of the computing device to at least one of the featured devices.

12. The computer-implemented method of claim 11, wherein sending the information descriptive of the computing device comprises:
causing, by the computing device, playback of an encoded audio signal at an audio output device associated with the computing device, wherein the encoded audio signal is configured to identify the computing device upon capture of the encoded audio signal at an audio capture device of a second computing device.

13. The computer-implemented method of claim 11, wherein, prior to sending the information descriptive of the computing device, the method comprises:
receiving, by the computing device from a computing system associated with the communication session, information indicating that at least two computing devices connected to the communication session are co-located.

14. The computer-implemented method of claim 1, wherein receiving the co-location information for each of the two or more featured devices comprises:
receiving, by the computing device, a local wireless signal from a featured device of the two or more featured devices that identifies the featured device.

15. The computer-implemented method of claim 1, wherein determining that the two or more of the plurality of second computing devices are featured devices comprises:
receiving, by the computing device from a computing system associated with the communication session, communication information that identifies the two or more of the plurality of second computing devices as the featured devices.

16. A computing device, comprising:
one or more processors; and
one or more non-transitory computer-readable media that store instructions that, when executed by the one or more processors, cause the computing device to perform operations, the operations comprising:

receiving mixed audio data from a computing system that orchestrates a communication session, wherein the computing device is connected to the communication session, wherein the mixed audio data comprises mixed audio comprising audio captured by a plurality of second computing devices connected to the communication session;

comparing the mixed audio and audio captured by the computing device prior to receipt of the mixed audio data to determine that the computing device is co-located with at least one of the plurality of second computing devices;

obtaining information indicating that two or more of the plurality of second computing devices are featured devices that have contributed audio to the mixed audio within a particular period of time;

receiving co-location information determined by each of the two or more featured devices, wherein the co-location information is indicative of whether a featured device is co-located with the computing device; and based on the co-location information for each of the two or more featured devices, making a determination that at least one featured device of the two or more featured devices is co-located with the computing device.

17. The computing device of claim 16, wherein the operations further comprise sending information indicating that the computing device is co-located with the at least one featured device to the computing system.

18. The computing device of claim 16, wherein the operations further comprise sending information indicating that the computing device is co-located with the at least one featured device to the at least one featured device.

19. The computing device of claim 16, wherein receiving the co-location information comprises receiving co-location information descriptive of a geographic location of each of the two or more featured devices.

20. One or more non-transitory computer-readable media that store instructions that, when executed by one or more processors of a computing device, cause the one or more processors to perform operations, the operations comprising:

receiving mixed audio data from a computing system that orchestrates a communication session, wherein the computing device is connected to the communication session, wherein the mixed audio data comprises mixed audio comprising audio captured by a plurality of second computing devices connected to the communication session;

comparing the mixed audio and audio captured by the computing device prior to receipt of the mixed audio data to determine that the computing device is co-located with at least one of the plurality of second computing devices;

obtaining information indicating that two or more of the plurality of second computing devices are featured devices that have contributed audio to the mixed audio within a particular period of time;

receiving co-location information determined by each of the two or more featured devices, wherein the co-location information is indicative of whether a featured device is co-located with the computing device; and based on the co-location information for each of the two or more featured devices, making a determination that at least one featured device of the two or more featured devices is co-located with the computing device.

* * * * *